United States Patent [19]

Yamawaki et al.

[11] 4,147,336
[45] Apr. 3, 1979

[54] SEAT FRAME FOR A VEHICLE

[75] Inventors: Takeshi Yamawaki, Okazaki; Hirofumi Kume, Toyota, both of Japan

[73] Assignee: Toyota Jidosha Kogyo Kabushiki Kaisha, Toyota, Japan

[21] Appl. No.: 849,331

[22] Filed: Nov. 7, 1977

[30] Foreign Application Priority Data

Dec. 20, 1976 [JP] Japan .................................. 51-153726

[51] Int. Cl.$^2$ .............................................. F16F 3/02
[52] U.S. Cl. ........................................ 267/111; 5/260; 267/112; 297/452
[58] Field of Search .................. 267/80, 102, 103, 104, 267/105, 106, 107, 108, 109, 110, 111, 112; 5/260, 262; 297/452

[56] References Cited

U.S. PATENT DOCUMENTS

| 3,035,828 | 5/1962 | Stubnitz | 267/110 |
| 3,070,814 | 1/1963 | Withoff | 267/80 X |
| 3,628,830 | 12/1971 | Mitjons | 297/452 X |
| 3,797,886 | 3/1974 | Griffiths | 257/452 |

FOREIGN PATENT DOCUMENTS

| 842072 | 7/1960 | United Kingdom | 267/110 |
| 961290 | 6/1964 | United Kingdom | 297/452 |

Primary Examiner—George E. A. Halvosa
Attorney, Agent, or Firm—Stevens, Davis, Miller & Mosher

[57] ABSTRACT

A seat frame wherein erect walls constituting the peripheral wall of the seat frame are bent to form columnar reinforcement ribs, and flange portions being the upper end faces of the reinforcement ribs are formed with mounting parts for a spring base, so that even when the peripheral wall of the seat frame is subjected to an intense tensile load inwards, it is prevented from turning inwardly to be deformed or damaged.

11 Claims, 6 Drawing Figures

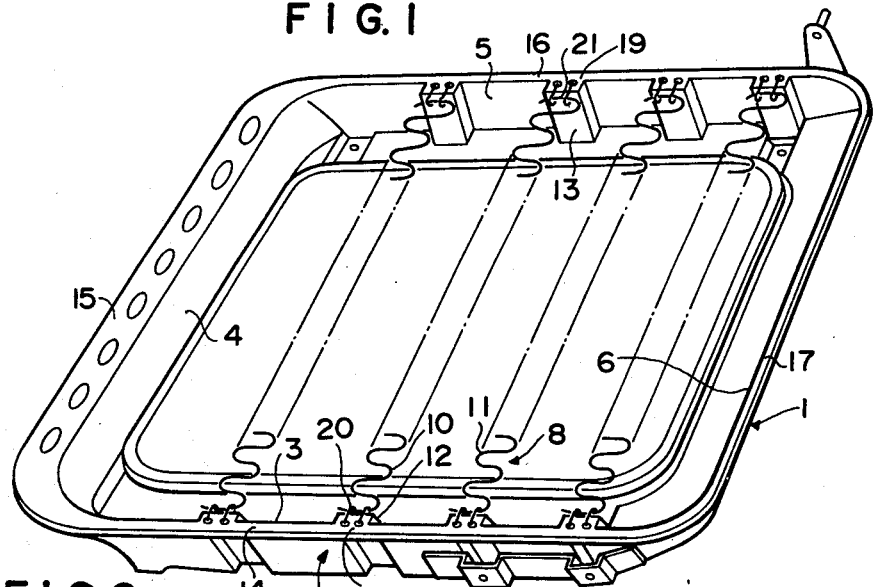
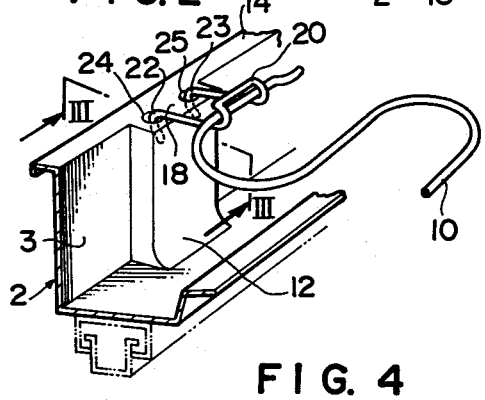
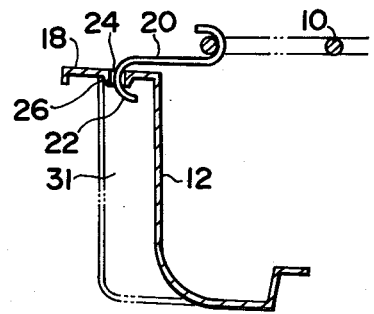
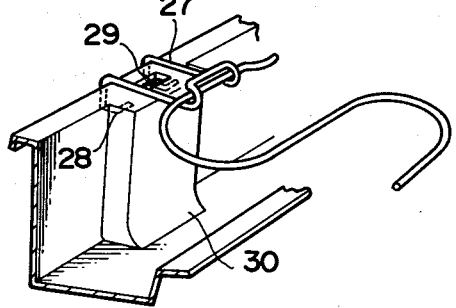

SEAT FRAME FOR A VEHICLE

BACKGROUND OF THE INVENTION

This invention relates to improvements in the seat frame of a seat for a vehicle.

The seat frame of a prior art seat for a vehicle is such that flanges are integrally formed at the upper end of a peripheral wall composed of flat erect wall portions, and that mounting holes or the like for a spring base are directly provided in the flange portions. With such structure, however, the body-weight of an occupant acts as an inward tensile load on the upper end of the peripheral wall through the spring base, so that such deformation as throws the peripheral wall down inwards is prone to occur. Another disadvantage is that stresses ascribable to the load are concentrated on the mounting holes of the flange portions and that the seat frame is easily damaged from the mounting hole part. In order to prevent the deformation and the damage, the seat frame has been fabricated of a steel plate being as thick as 1.2 mm. The use of such thick steel plate incurs increase in the amount of consumption of steel plates, increase in labor in the handling of the seat as attributed to the increase of weight, increase in the amount of fuel consumption, etc.

An object of this invention to provide a seat frame in which even when the peripheral wall thereof is subjected to an intense inward tensile load, it is not turned inwards and is prevented from being deformed or damaged. Another object of this invention is to provide a seat frame which can be fabricated of a thinner metal plate than in the prior art seat frame and is remarkably excellent from the standpoint of material and weight. A further object is to provide the optimum shape and structure for the integral molding of a seat frame with a press and to thereby enhance the productivity.

BRIEF DESCRIPTION OF THE DRAWINGS

These and other objects and features of this invention will become apparent from the following description taken with reference to the accompanying drawings, in which:

FIGS. 1 to 3 are views which show a seat frame embodying this invention,

FIG. 4 is a perspective view which shows a modification of a spring hanger in the embodiment of FIG. 1, and FIGS. 5 and 6 are perspective views which show another embodiment of this invention.

DETAILED DESCRIPTION OF THE PREFERRED EMBODIMENTS

FIGS. 1 to 3 illustrate an aspect of performance. A seat frame 1 has its peripheral wall 2 formed of erect wall portions 3, 4, 5 and 6 which are continuous and integral and which are molded of a steel plate by the press work.

Figure 5:
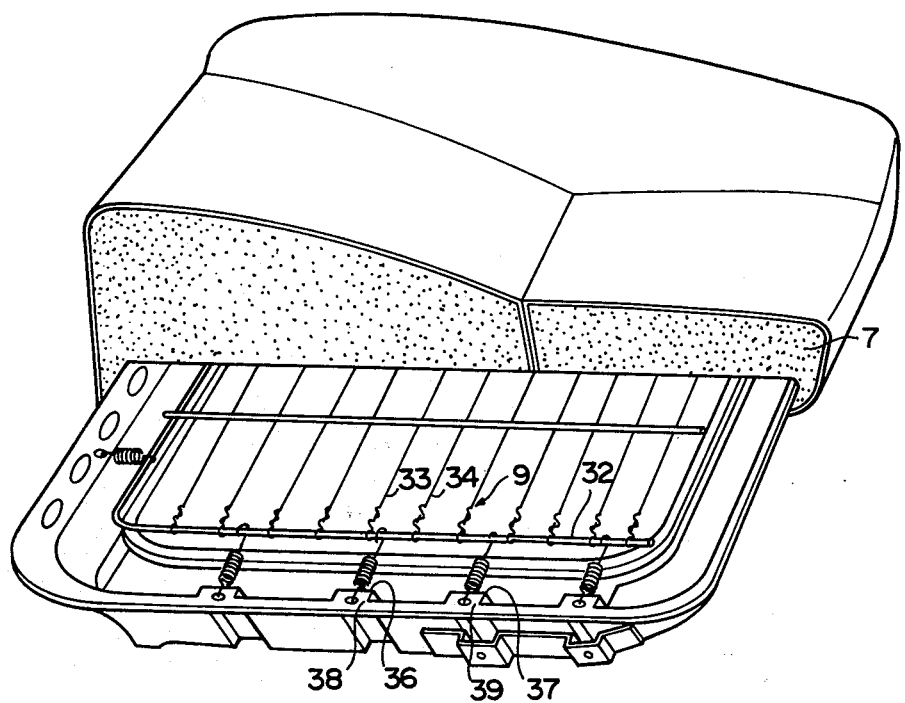

As shown in FIG. 5, the seat frame 1 is enclosed in a cushion material 7. The cushion material 7 is received and supported by spring bases 8 and 9.

In the embodiment shown in FIGS. 1 to 3, the spring base 8 is composed of a large number of trains of S-shaped springs 10, 11 which are extended between the erect wall portions 3 and 5 of the seat frame 1.

The S-shaped springs 10, 11 are directly mounted on the erect wall portions 3 and 5 of the seat frame 1. As regards mounting parts in the erect wall portions 3 and 5, the embodiment shown in FIGS. 2 and 3 is such that the steel plate forming the erect wall portions 3 and 5 is bent inwards so as to define the U-shape in the transverse section and that columnar reinforcement ribs 12 and 13 are provided which extend continuously from the lower edges to the upper edges of the erect wall portions 3 and 5 respectively.

The upper ends of the erect wall portions 3–6 forming the peripheral wall 2 are turned outwards into the L-shape so as to form flange portions 14, 15, 16 and 17. The upper end faces of the reinforcement ribs 12 and 13 are also made flange portions 18 and 19 even with the flange portions 14 and 16 respectively.

The flange portions 18, 19 of the reinforcement ribs 12, 13 are the mounting portions of the spring base 8. In the example of FIGS. 1–3, the flange portions 14, 16 are provided with apertures 24 and 25 into which both leg ends 22 and 23 of U-shaped spring hangers 20, 21 are snugly inserted.

Each aperture 24, 25 is formed with a short cylinder-like protuberant wall 26 by the burring working.

The probuberant wall 26 reinforces the wall of the aperture 24, 25.

FIG. 4 shows a spring hanger 27 in another aspect. Both leg ends 28 and 29 of the hanger 27 bent into the U-shape are plugged into a concave portion (a portion indicated by numeral 31 in FIG. 3) behind a reinforcement rib 30 having the same structure as shown in FIG. 2, so that the spring hanger 27 is supported by the full width part of the flange 18.

Figure 6:
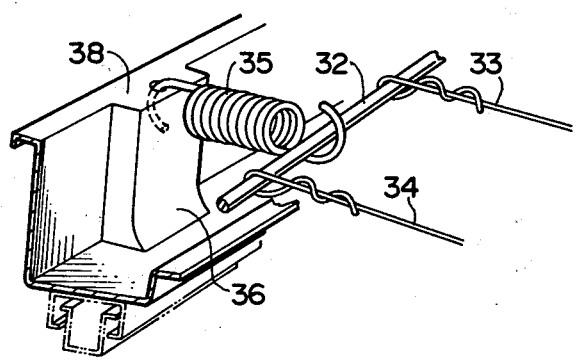

In the embodiment shown in FIGS. 5 and 6, the spring base 9 has such a structure that a large number of spring steel wires 33, 34 are extended between metallic framing wires 32. The metallic framing wires 32 are hooked to flange portions 38, 39 of the upper end faces of reinforcement ribs 36, 37 through coiled springs 35.

The spring hangers 20, 21, 27 and the coiled springs 35 in the foregoing embodiments form the fittings of the spring bases.

As described above, in this invention, the flange portions which are the upper end faces of the columnar reinforcement ribs formed by bending the erect walls consituting the peripheral wall of the seat frame are the mounting parts of the spring base. Owing to the presence of the reinforcement ribs, therefore, the rigidity of the portions is remarkably high. Even when an intense tensile load acts through the spring base, such deformation as the collapse of the peripheral wall does not occur. Besides, the fittings of the spring base are arranged on the comparatively broad flange portions of the upper end faces of the reinforcement ribs. Therefore, the flexibility for adopting a mounting structure capable of avoiding the concentration of stresses is high, with the result that any damage from the spring base mounting portion can be prevented.

In consequence, whereas the steel plate having been used in the prior art structure is about 1.2 mm thick, the same strength can be retained by a steel plate being about 0.9 mm thick, which is remarkably advantageous from the standpoint of material and the weight.

Further, since addition of any special structure for mounting the spring base becomes quite unnecessary, the flanges at the parts of the peripheral wall other than the flange portions of the upper end faces of the reinforcement ribs can be put into the optimum shape and structure for the integral molding of the seat frame with a press, so that productivity can be enhanced.

What we claim is:

1. A seat frame for a vehicle, said seat frame comprising:
   a one-piece integral peripheral wall of metal plate comprising erect wall portions, flange portions extending outwardly from the upper end of said erect wall portions, and erect reinforcement ribs spaced along opposing ones of said wall portions, each of said reinforcement ribs being defined by an inwardly bent section of the corresponding wall portion which defines a hollow substantially rectangular in tranvserse cross-section extending inwardly from the exterior surface of said wall portions, each of said reinforcement ribs being substantially vertically coextensive with the corresponding wall portion and having an upper end face in the same plane as said flange portions and extending inwardly from the corresponding flange portion;
   a spring base for receiving cushioning material enclosing the seat frame; and
   a spring base fitting means for mounting said spring base between two opposing reinforcement ribs on opposing ones of said erect wall portions.

2. The seat frame for a vehicle according to claim 1, wherein each of said reinforcement ribs is bent so as to define a U-shape in transverse section, and is in the form of a column extending continuously from a lower edge to an upper edge of said erect wall portion.

3. The seat frame for a vehicle according to claim 1, wherein each of the first-mentioned flange portions is formed by turning an upper end of said erect wall portion outwards into the form of an L.

4. The seat frame for a vehicle according to claim 1, wherein said spring base comprises a large number of S-shaped springs.

5. The seat frame for a vehicle according to claim 1, wherein the upper end face of said reinforcement ribs is provided with apertures in which are snugly positioned said spring base fitting means.

6. The seat frame for a vehicle according to claim 5, wherein said spring base fitting means is U-shaped, rear end parts thereof are bent leg parts snugly inserted into said apertures, and a fore end part thereof is a bent part which can support said spring base.

7. The seat frame for a vehicle according to claim 6, wherein each of said apertures is defined by a short cylinder-like protuberant wall.

8. The seat frame for a vehicle according to claim 1, wherein leg parts of said fitting means are plugged in a concave portion behind each of said reinforcement rib.

9. The seat frame for a vehicle according to claim 1, wherein said spring base has a large number of spring steel wires extended within metallic framing wires.

10. The seat frame for a vehicle according to claim 1, wherein said fitting means is a coiled spring.

11. A seat frame for a vehicle, said seat frame comprising:
   a one-piece integral peripheral wall of metal plate comprising:
     four substantially vertical wall sections defining a rectangular spring base space therebetween;
     a corresponding substantially horizontal flange extending outwardly from each of said wall sections; and
     a plurality of substantially vertical reinforcement ribs defined in each of at least two opposing ones of said wall sections, said reinforcement ribs being spaced along the corresponding wall section, each of said reinforcement ribs being U-shaped in transverse cross-section, being vertically coextensive with the corresponding wall section and comprising:
       a first substantially planar substantially vertical face substantially parallel to and spaced inwardly from the corresponding wall section;
       second and third substantially parallel substantially vertical substantially planar faces directly interconnecting the transverse substantially vertical edges of the first section and the corresponding wall section; and
       a fourth substantially horizontal substantially planar end face substantially coplanar with and extending directly inwardly from the flange on the corresponding wall section, said fourth face being directly connected to the upper end of said first, second and third faces;
   a spring base for receiving cushioning material enclosing the seat frame, said spring base being in said spring base space; and
   a spring base fitting means for mounting said spring base between at least two opposing ones of said reinforcement ribs on the respective two opposing ones of said wall sections.

* * * * *